United States Patent [19]

McCulloch et al.

[11] 3,973,510

[45] Aug. 10, 1976

[54] SUBMERSIBLE OBJECT HAVING DRAG REDUCTION AND METHOD

[75] Inventors: Charles R. McCulloch, Shalimar, Fla.; Robert C. Gill, Pomfret, Md.

[73] Assignee: The United States of America as represented by the Secretary of the Navy, Washington, D.C.

[22] Filed: Sept. 9, 1974

[21] Appl. No.: 504,636

[52] U.S. Cl............................. 114/67 A; 427/204; 427/265; 427/287; 427/386; 427/387; 427/388; 428/150; 428/325; 428/331
[51] Int. Cl.²......................................... B63B 1/34
[58] Field of Search ............ 427/204, 384, 265, 287, 427/386, 387, 388; 428/149, 150, 325, 331; 114/67 R, 67 A

[56] References Cited
UNITED STATES PATENTS

| 2,332,196 | 10/1943 | Bjorksten | 114/67 R |
|---|---|---|---|
| 3,076,725 | 2/1963 | Boggs | 428/339 |
| 3,168,411 | 2/1965 | Walsh | 427/204 |
| 3,476,577 | 11/1969 | Davie | 427/204 |
| 3,554,154 | 1/1971 | Thomas | 114/67 R |
| 3,575,123 | 4/1971 | Shepherd et al. | 114/67 R |
| 3,617,366 | 11/1971 | Tully et al. | 428/331 |
| 3,702,778 | 11/1972 | Mueller et al. | 114/67 R |

FOREIGN PATENTS OR APPLICATIONS

| 2,050,794 | 4/1971 | France | 114/67 R |
|---|---|---|---|
| 194,548 | 3/1923 | United Kingdom | 427/376 |
| 12,230 | 2/1849 | United Kingdom | 428/149 |

*Primary Examiner*—Ronald W. Smith
*Assistant Examiner*—Dennis C. Konopacki

[57] ABSTRACT

A submersible object having a drag reducing coating thereon, and a method for its preparation, which comprises applying to the object a binding agent and sufficient hydrophobic silica to provide the object with a nonuniform coating, the function of the binding agent being merely to fix the hydrophobic silica on the submersible object.

6 Claims, No Drawings

SUBMERSIBLE OBJECT HAVING DRAG REDUCTION AND METHOD

BACKGROUND OF THE INVENTION

This invention relates to drag reduction on submersible or submerged objects, and more specifically to submersible objects having a drag reduction coating of hydrophobic silica. A factor which limits speed and increases fuel consumption of surface and subsurface vessels is the drag resistance effected at the interface of the vessel with the aqueous environment. In recent years, serious attempts have been made to reduce the friction coefficient between seagoing vessels and the medium in which they travel by the introduction of long chain hydrophilic polymers into the vicinity of the interface between the hull of the vessel and the water. Typical hydrophilic polymers are:

A. Polyethylene oxide, in molecular weight of 1 to 5 million.

B. Natural products such as okra.

C. High molecular weight derivatives of substituted polyethyleneimines.

The inherent disadvantages of these materials, however, are that they require a continuous flow of the material over the vessel during motion and imply the use of pumping equipment, metering devices, and the associated weight of this equipment and materials in areas which are normally confined. The use of this approach offers no particular advantage to a vessel at rest and would require anchoring devices as cumbersome as those in current use. Additionally the material is dispersed in the water resulting in an undesirable ecological effect. Thus, the advantages of currently used drag reducing equipment do not outweigh the disadvantages.

Various coatings are also used to reduce drag. Hydrophilic acrylic resins are known as drag reducing coatings. Polybutadiene and polyurethane coatings are also drag reducing coatings. These materials are adequate, but there is still room for improvement. The drag reducing coatings of the present invention provide improved drag reducing coatings which are useful for ship's hull of surface and subsurface ships, and other devices which move through or under water.

SUMMARY OF THE INVENTION

Therefore, it is an objective of this invention to provide a submerged or submersible object having reduced drag.

Also it is an objective of this invention to provide a coated submerged or submersible object having reduced drag.

It is a further objective of this invention to provide a simplified method for reducing drag on a submerged or a submersible object.

It is a still further objective of this invention to provide a method for reducing drag on a submerged or submersible object by coating the submersible object.

These and other objects of the invention are met by applying a coating of hydrophobic silica to a submersible object.

DESCRIPTION OF THE PREFERRED EMBODIMENTS

Hydrophobic silica is applied as a permanent coating to a submerged or submersible object in order to reduce drag.

Any submersible (hereafter submersible includes submerged) object which moves through the water encounters drag resistance. Typical submersible objects include ship hulls and submarines, for example. Reduction of drag resistance is accomplished by applying hydrophobic silica to the water contacting surface of the submersible object. Hydrophobic silica is finely divided and has a particle diameter of 100 microns or less. One brand of hydrophobic silica is sold under the tradename Silanox 101 available from Cabot Corporations. Coating of submersible objects with hydrophobic silica reduces drag resistance which results in higher speed, lower fuel consumption, or both for the same amount of energy expended.

There are various ways to apply the desired coating of hydrophobic silica. The vessel or submersible object may be coated with an adhesive or polymeric material as typified by epoxies; polyhydrocarbons, polyesters, polyurethanes, and while still in a tacky, uncured state, is overlayed with a blown coating of the hydrophobic silica, the adhesive or polymeric material being subsequently cured. Alternately, the hydrophobic silica may be incorporated into these materials and subsequently cured. Preferentially the finalized surface should be characterized by an uneven surface which facilitates the formation of an air interface between the vessel and the aqueous environment as typified by the gaseous plastron effect as observed in aquatic insects and mammals. The following theory of drag reduction is not intended to represent the only possible explanation. Other theories may well explain this phenomenon. The gaseous plastron effect refers to the mechanism by which insects or water mammals form air bubbles on their skin in order to dive. When such bubbles form on a coated surface escaping gas is believed to reduce drag. Other polymers suitable for use are polyethers, polyperfluorohydrocarbons, and polysiloxanes. Any polymer suitable for use as a binding agent or adhesive which can coat a submersible object and hold the hydrophobic silica in place is operable for the purpose of this invention. Nonuniformity of the drag reducing coating is achieved by standard coating processes described hereafter.

Particular advantages could be realized with the use of fluorocarbon polymers since:

A. They have an inherently low friction resistance to all substrates;

B. They are essentially nonbiodegradable, which would reduce growth of such sea organisms as barnacles and other related marine organisms.

Polytetrafluoroethylene is an especially useful fluorocarbon. Alternate methods of coating marine vessels would include treatment of metal surfaces with trialkyl or triaryl silanechloride.

Various coating materials of a polymeric nature are exemplified in U.S. Pat. No. 3,076,725 to Boggs, U.S. Pat. No. 3,639,583 to Cardarelli et al., and U.S. Pat. No. 3,702,778 to Mueller et al. and U.S. Pat. No. 3,205,054 to Tucker, all patents being incorporated herein by reference.

The uneven coating mentioned above is achieved in any standard fashion. If the polymer is applied first and the hydrophobic silica coated thereover, the particulate nature of the silica inherently produces an uneven coating. If the hydrophobic silica is incorporated in the polymer so that only one coating step is used, the hydrophobic silica must have a concentration so as to produce an uneven coating when the polymer-silica combination is applied. A composition which will provide an uneven coating requires at least 50% silica by weight, preferably 60% and more preferably 70% silica by weight of the composition.

Various additives may be included in the hydrophobic silica as a means of controlling and reducing marine growth. Alternate additives to the hydrophobic silica and co-additives to the silica include copper silicate, copper kojate, copper naphthanate, and copper complexes of polyethylene-imine as a means of controlling and reducing marine growth. This system of coating to reduce drag can be extended to the application of the gaseous plasetron effect as a method of reducing cavitational turbulence in propeller drive shafts, vanes, and stability devices normal to marine vessels.

The following example is intended to illustrate without unduly limiting the invention.

EXAMPLE

The time to traverse of a block of wood (wgt. = 95.31 gms: size: 6 × 4 × 1 in.) in a water tank under constant load of 1 gm. was determined to be 8.1 secs. over a distance of 19 inches. A second comparable block coated with an adhesive polybutadienepolyurethane liner gave a traverse time of 7.9 secs.

The third comparable block painted with the polubutadienepolyurethane liner was subsequently coated with the hydrophobic silica before cure, and give a traverse time of 7.3 secs. This indicates that under the same load condition, drag or resistance to motion was reduced by 9.9%, demonstrating the efficiency of the gaseous plasetron effect in reducing friction between the vessel and the water.

These statistics also illustrate the beneficial drag reduction of hydrophobic silica and a synergistic effect of hydrophobic silica on drag reduction in combination with another coating.

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A submersible object having a polymeric drag reducing coating on the water contacting surface of the submersible object, wherein the improvement comprises the incorporation in said polymeric coating of at least 50% by weight of hydrophobic silica in order to produce a nonuniform coating on the submersible object.

2. The object of claim 1 wherein said coating includes a marine growth reducing agent.

3. A method of reducing drag on a submersible object which comprises coating the water contacting surface of the object with an uncured, tacky binding agent selected from the group consisting of an epoxy resin, a polyether resin, a polyester resin, a polyurethane resin, a polyhydrocarbon resin, a polyperfluorinated hydrocarbon resin, a polysiloxane resin and mixtures thereof, applying a coating of hydrophobic silica to said tacky binding agent; and curing said tacky binding agent, the binding agent causing the hydrophobic silica to adhere firmly to said object, thus providing said object with a nonuniform coating.

4. A method of reducing drag on a submersible object which comprises blending hydrophobic silica with an uncured binding agent selected from the group consisting of an epoxy resin, a polyether resin, a polyester resin, a polyurethane resin, a polyhydrocarbon resin, a polyperfluorinated hydrocarbon resin, a polysiloxane resin, and mixtures thereof to form a coating material containing at least 50% hydrophobic silica by weight; applying said coating material to the water contacting surface of said object; and curing said coating material, thus providing said object with a nonuniform coating.

5. A submersible object having on the water contacting surface of the object a nonuniform coating consisting essentially of hydrophobic silica and a binding agent selected from the group consisting of an epoxy resin, a polyether resin, a polyester resin, a polyurethane resin, a polyhydrocarbon resin, a polyperfluorinated hydrocarbon resin, a polysiloxane resin, and mixtures thereof, wherein the binding agent forms a base coat, and the hydrophobic silica forms a top coat on said object.

6. A submersible object having on the water contacting surface of the object a nonuniform coating consisting essentially of hydrophobic silica and a binding agent selected from the group consisting of an epoxy resin, a polyether resin, a polyester resin, a polyurethane resin, a polyhydrocarbon resin, a polyperfluorinated hydrocarbon resin, a polysiloxane resin, and mixtures thereof, wherein the coating is a mixture of hydrophobic silica and binding agent, and wherein the mixture contains at least 50% hydrophobic silica by weight.

* * * * *